(12) United States Patent
DiFoggio

(10) Patent No.: US 10,830,719 B2
(45) Date of Patent: Nov. 10, 2020

(54) DEVICES AND RELATED METHODS FOR ESTIMATING ACCUMULATED THERMAL DAMAGE OF DOWNHOLE COMPONENTS

(71) Applicant: Baker Hughes, a GE company, LLC, Houston, TX (US)

(72) Inventor: Rocco DiFoggio, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 511 days.

(21) Appl. No.: 15/709,187

(22) Filed: Sep. 19, 2017

(65) Prior Publication Data

US 2019/0086348 A1 Mar. 21, 2019

(51) Int. Cl.
| | |
|---|---|
| *G01N 25/72* | (2006.01) |
| *G01V 9/00* | (2006.01) |
| *G01K 7/16* | (2006.01) |
| *G01K 3/04* | (2006.01) |
| *G01K 7/24* | (2006.01) |

(52) U.S. Cl.
CPC ............... *G01N 25/72* (2013.01); *G01K 3/04* (2013.01); *G01K 7/16* (2013.01); *G01K 7/24* (2013.01); *G01V 9/005* (2013.01)

(58) Field of Classification Search
CPC .......... G01N 25/72; G01V 9/005; G01K 7/16; G01K 3/04; G01K 7/24
See application file for complete search history.

(56) References Cited

U.S. PATENT DOCUMENTS

| | | | |
|---|---|---|---|
| 3,457,636 A | 7/1969 | John et al. | |
| 4,414,837 A | 11/1983 | Bice et al. | |
| 5,182,212 A | 1/1993 | Jalinski | |
| 5,795,069 A | 8/1998 | Mattes et al. | |
| 6,813,570 B2 | 11/2004 | Gee | |
| 8,356,514 B2 | 1/2013 | Wang et al. | |
| 8,598,681 B2 | 12/2013 | Le et al. | |
| 8,729,973 B2 | 5/2014 | Van et al. | |
| 9,176,089 B2 | 11/2015 | Le et al. | |
| 2006/0085134 A1 | 4/2006 | Dion et al. | |

(Continued)

FOREIGN PATENT DOCUMENTS

| | | |
|---|---|---|
| DE | 3839414 A1 | 5/1990 |
| DE | 4208135 A1 | 9/1993 |

(Continued)

OTHER PUBLICATIONS

://multimedia.3m.com/mws/media/215506O/3mtm-monitormarktm-time-temperature-indicators-brochure.pdf.

(Continued)

*Primary Examiner* — Brandi N Hopkins
*Assistant Examiner* — Janice M Soto
(74) *Attorney, Agent, or Firm* — Mossman Kumar & Tyler PC

(57) ABSTRACT

A thermal aging estimator for use in a borehole having an ambient temperature of at least 200° F. The estimator may include a thermal aging element positioned adjacent to a heat-sensitive component while in the ambient temperature of at least 200° F. The thermal aging element has a permanent change in an electrical property in response to a thermal exposure, which correlates to cumulative thermal damage from the thermal exposure. The change estimating circuit applies an electrical signal to the thermal aging element.

17 Claims, 3 Drawing Sheets

(56) References Cited

U.S. PATENT DOCUMENTS

| | | | |
|---|---|---|---|
| 2007/0275467 A1 | 11/2007 | Louvet et al. | |
| 2008/0004372 A1 | 1/2008 | Prusik et al. | |
| 2012/0053838 A1* | 3/2012 | Andrews | E21B 49/082 702/8 |
| 2012/0073357 A1 | 3/2012 | Gatzmanga et al. | |
| 2013/0026978 A1 | 1/2013 | Cooley et al. | |
| 2013/0168815 A1* | 7/2013 | Le Neel | G01K 3/005 257/536 |
| 2015/0142343 A1 | 5/2015 | Zach et al. | |
| 2015/0285691 A1 | 10/2015 | Caffee et al. | |
| 2016/0025892 A1* | 1/2016 | Sinclair | G01V 5/045 250/254 |
| 2016/0349132 A1 | 12/2016 | Hasegawa et al. | |

FOREIGN PATENT DOCUMENTS

| | | |
|---|---|---|
| WO | 1998013679 A1 | 4/1998 |
| WO | 1999053273 A1 | 10/1999 |
| WO | 2006091631 A2 | 8/2006 |
| WO | 2010003987 A1 | 1/2010 |

OTHER PUBLICATIONS

Ang, W. et al., "Design, Simulation and Characterization of Wheatstone Bridge Structured Metal Thin Film Uncooled Microbolometer," ScienceDirect, Procedia Engineering 94 (2014) 6-13.

Malmros, Combined TiN- and TaN Temperature Compensated Thin Film Resistors.

Neji, "Micro-Fabricated DC Comparison Calorimteter for RF Power Measurement," Sensors, 2014, 14, 20245-20261.

National Technology and Science Press 2009, Multisim Demo 2.3: Thermal Sensing Wheatstone Bridge.

PCT Application No. PCT/US2018/050245—International Search Report dated Jan. 15, 2019.

Schweber, "The Wheatstone Bridge: Still the Preferred Sensor-Interface Topology After 180 Years," http://electronics360.globalspec.com/article/6522/the-wheatstone-bridge-stil-the-preferred, Electronics 360.

Talic, et al.,"MEMS Flow Sensors Based on Self-Heated aGe-Thermistors in a Wheatstone Bridge," Open Access Sensors ISSN 1424-8220, www.mdpi.com/journal/sensors, Sensors 2015, 15, 10004-10025; doi:10.3390/s150510004.

Volklein, et al., "MEMS Pirani Type Vacuum Sensor with Extended Sensitivity Range," University of Applied Sciences, Institute for Microtechnologies (IMtech), Am Bruckweg 26, 65428 Russelsheim.

Valentin, et al., "Remaining Life Assessment of Aging Electronics in Avionic Applications," University of Maryland College Park.

Ortuno, et al, Effect of Temperature, Atmosphere and Methods on the Thermal Degradation of Printed Circuit Boards, Chemical Engineering Department, University of Alicante.

https://en.wikipedia.org/wiki/Failure_of_electronic_components.

Vishay, Components: Stabiity of Thin Film Resistors.

Vishay—Drift Calculation for Thin Film Resistors.

Tantalum Nitride Resistor Thermal Aging in Oxygen, http://www.thinfilm.com/equation.html.

Resistor Aging Rates with Temperature, http://licn.typepad.com/my_weblog/2010/12/resistor-aging-rates-vs-temperature-john-dunn-consultant-ambertec-pe-pc.html.

* cited by examiner

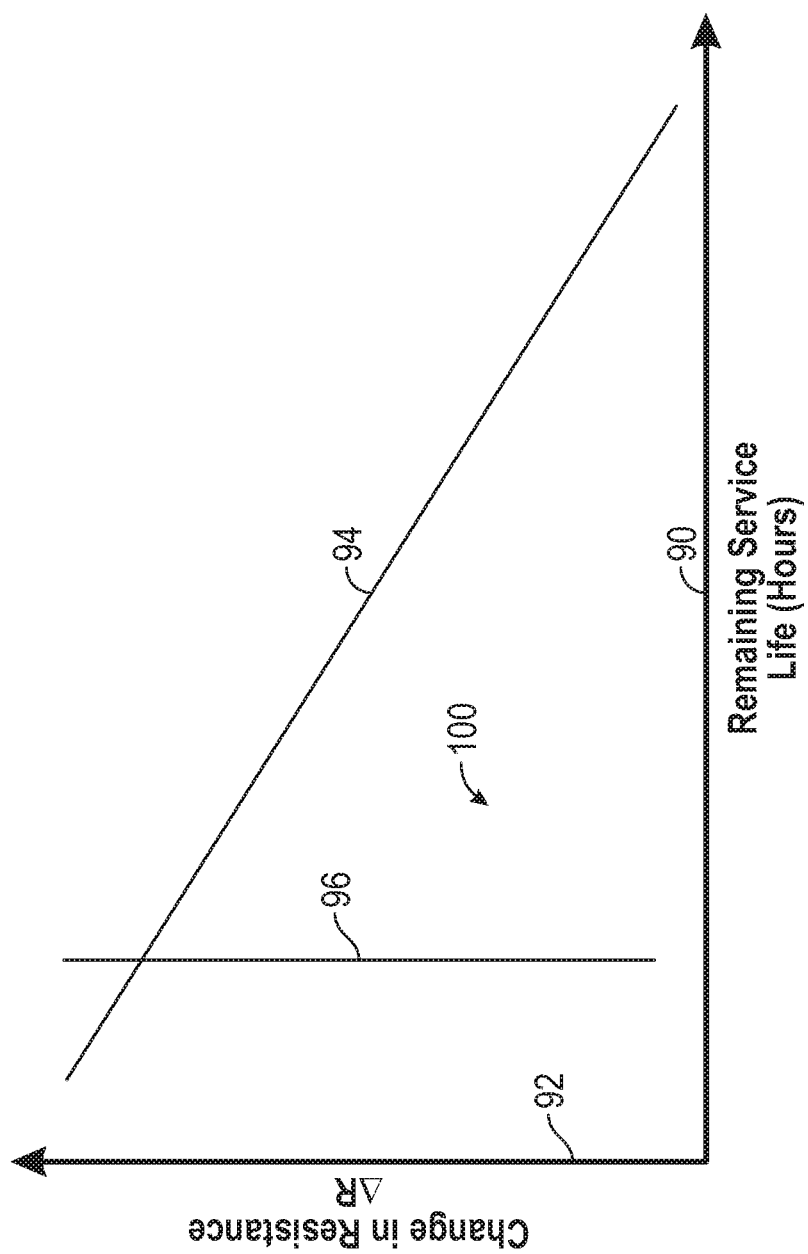

DEVICES AND RELATED METHODS FOR ESTIMATING ACCUMULATED THERMAL DAMAGE OF DOWNHOLE COMPONENTS

FIELD OF THE DISCLOSURE

This disclosure pertains generally to devices and methods for providing shock and vibration protection for downhole devices.

BACKGROUND OF THE DISCLOSURE

Exploration and production of hydrocarbons generally requires the use of various tools that are lowered into a borehole, such as wireline assemblies, drilling assemblies, measurement tools and production devices (e.g., fracturing tools). Heat sensitive components may be disposed downhole for various purposes, measuring one or more parameters of interest, control of downhole tools, processing data, communication with the surface and storage and analysis of data. Some heat sensitive components degrade over time from prolonged and repeated exposure to the relatively hot ambient downhole environment, e.g., 200° F. or greater. To ensure reliability, it is desirable to record a temperature history of such components in order to calculate their expected remaining lifetime. It is preferable to replace heat sensitive components before an expected failure to avoid impacting a given downhole operation. However, it is undesirable to replace equipment so often as to incur unnecessary cost.

In one aspect, the present disclosure addresses the need to cost-effectively and simply obtain temperature history for heat sensitive components used in a borehole.

SUMMARY OF THE DISCLOSURE

In aspects, the present disclosure provides a thermal aging estimator for use in a borehole having an ambient temperature of at least 200° F. The estimator may include a heat-sensitive component, a thermal aging element, and a change estimating circuit. The thermal aging element is positioned adjacent to the heat-sensitive component while in the ambient temperature of at least 200° F. The thermal aging element has a permanent change in an electrical property in response to a thermal exposure. The permanent change correlates to cumulative thermal damage from the thermal exposure. The change estimating circuit is connected to the thermal aging element and applies an electrical signal to the thermal aging element.

In aspects, the present disclosure provides a method of operating a heat-sensitive component. The method includes the steps of positioning a thermal aging element adjacent to the heat-sensitive component; conveying the thermal aging element and the heat-sensitive component into a borehole having an ambient temperature of at least 200° F.; energizing the operating downhole tool to perform a predetermined function; retrieving the thermal aging element and the heat-sensitive component from the borehole; estimating the thermal aging of the heat-sensitive component by estimating a permanent change of an electrical property of the thermal aging element due to a thermal exposure, wherein the permanent change correlates to cumulative thermal damage from the thermal exposure; and deploying the downhole tool again if the determined estimated change is below a predetermined value. Alternatively, the thermal aging element can be monitored in real time while it is still downhole and before it is brought back to the surface.

Another method provided by the present disclosure includes positioning a thermal aging element adjacent to the heat-sensitive component; conveying the thermal aging element and the heat-sensitive component into a borehole having an ambient temperature of at least 200° F.; retrieving the thermal aging element and the heat-sensitive component from the borehole; and estimating the thermal aging of the heat-sensitive component by estimating a permanent change of an electrical property of the thermal aging element, wherein the permanent change correlates to cumulative thermal damage from the thermal exposure.

Examples of certain features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 4 is a graph that may be used as a reference with a thermal aging estimator according to the present disclosure.

DETAILED DESCRIPTION

In embodiments, the present disclosure provides devices and related methods for estimating thermal aging; i.e., the accumulated damage from exposure to thermal energy. The devices according to the present disclosure may be robust, simple, and inexpensive enough to be fixed on any equipment used downhole; e.g., circuit boards, enclosures for electronic equipment, chambers having hydraulic fluids, etc. In contrast to conventional instruments that are energized instruments that record and store temperature and time information, the present disclosure uses passive, non-energized devices that store information in the form of a physical and permanent change to one or more parts of the device.

Figure 1:
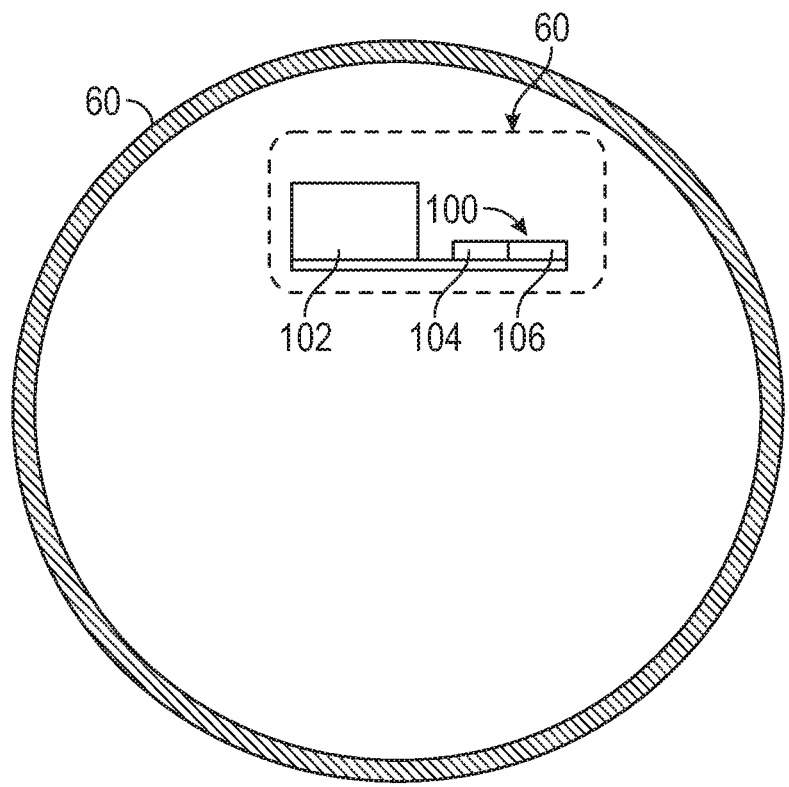
FIG. 1 shows a schematic of a well tool that uses a thermal aging estimator according to one embodiment of the present disclosure.

FIG. 1 illustrates a well tool 60 positioned in a section of a borehole conveyance device 62. Ambient temperatures in a borehole may be excess of 200° F., which is considered "hot" for the purposes of the present disclosure. In hot environments, a heat sensitive component 102 of the well tool 60 suffers thermal aging, which is damage that impairs performance, behavior, and/or causes failure. This thermal aging accumulates as a well tool 60 is repeatedly exposed to hot temperatures during use. The aging is not dependent on a particular temperature threshold or a duration of exposure being reached. For example, exposure to a temperature of 200° F. for ten hours may cause as much aging as exposure to a temperature of 300° F. for two hours.

In embodiments, a thermal aging estimator 100 may be used to characterize the accumulated damage to the heat sensitive component 102 from prolonged thermal exposure. The estimator 100 includes a thermal aging element 104 and a change estimating circuit 106. The thermal aging element 104 may be a body or structure that exhibits a permanent physical change to an electrical property of the sensor, such as resistance. The amount of physical change correlates with the duration and magnitude of the exposure. As used herein, the term "permanent" means that the physical change is irreversible. By "correlates," it is meant that the change does not simply indicate that there has been thermal exposure, but that the amount of change, in some fashion, characterizes the thermal exposure; e.g., quantifies the extent of damage from the exposure and, thereby, the remaining component lifetime.

In one embodiment, the thermal aging estimator 100 incorporates one or more electrical components that exhibit a change in resistance when exposed to thermal energy. In one arrangement, the thermal aging element 104 may be any structure that exhibits a discernible change in resistance that correlates to a thermal exposure. One non-limiting thermal aging element is a thin film resistor, which is a resistance element made of a metal, alloy, carbon, or other film and deposited on a substrate. The film thickness may be in the range of about 0.000001 inch (25 nanometers). Various colorimetric or other indicators that are meant as freshness indicators for perishable refrigerated products will not work at the hot temperatures found downhole nor will they operate over as wide a temperature range as a thin film resistor.

It is also commonly understood that thin film resistors generally follow the law of Arrhenius, which is expressed as an equation that relates chemical reaction rate (k) to the absolute temperature (T).

For thin film resistors, the equation is generally accepted as follows:

Let $(\Delta R/R)_{R,t0}$=the measured fractional change in resistance at some Reference temperature, TR, in degrees Kelvin, over a duration time, t0.

Let $(\Delta R/R)_{E,t}$=the estimated fractional change in resistance at some Elevated temperature, TE, in degrees Kelvin, over a duration time, t.

Then, the fractional change at some elevated temperature can be related to the fractional change at some reference temperature (such as room temperature) as $$(\Delta R/R)_{E,t} = 2^{(TE-TR)/30}(t/t0)^{1/3}(\Delta R/R)_{R,t0}. \quad (1)$$

According to Equation 1, the drift of the thin film resistor doubles for every 30 K increase in temperature and it also increases as the cube root of the hot duration time divided by the reference duration time.

This equation correlates a permanent change in resistance to cumulative thermal damage from thermal exposure. By cumulative, it is meant a sum of a plurality of sub-exposures to thermal energy, wherein each sub-exposure is defined by a time duration and a temperature magnitude and the permanent change correlates to an accumulation of thermal damage from all of the sub-exposures. The cumulative thermal damage is the time integral of the Arrhenius damage rate, which increases exponentially with increasing temperature. The damage may arise from chemical reactions due to the presence of humidity, oxygen, or other substances in the environment of the thin film resistor.

To estimate thermal aging, the change estimating circuit 106 applies an electrical signal to the thermal aging element 104. The response of the thermal aging element 104 to the electrical signal may then be measured in order to determine an electrical property, such as resistance. The change estimating circuit 106 includes components that do not have a permanent change in resistance in response to thermal exposure so that the measured resistance can be fully attributable to the thermal aging element 104.

Figure 2:
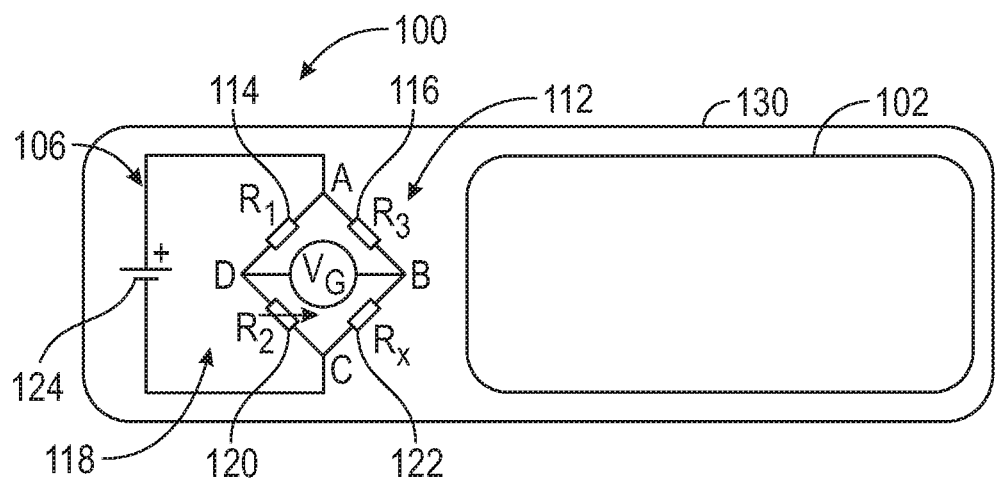
FIG. 2 illustrates one embodiment of a thermal aging estimator according to the present disclosure.

Referring to FIG. 2, in one non-limiting embodiment, the change estimating circuit 106 may be positioned on a circuit board 130 that is shared with the heat sensitive component 102. The change estimating circuit 106 may be configured as a Wheatstone bridge that includes a first leg 112 having first and second resistors 114, 116 that are insensitive to exposure to a hot environment. For instance, the first and second resistors 114, 116 may be formed of materials that do not exhibit a change in resistance when exposed to hot environments. A second leg 118 has a third resistor 120 that is insensitive to exposure to a hot environment and a fourth resistor 122 that exhibits a physical change in resistance to such environments. The fourth resistor 120 may be a thin-film resistor, which acts as the thermal aging element. The change in resistance of the fourth resistor 120 may be determined by balancing the bridge 110, e.g., by adjusting the resistance of the third resistor 118 and using a galvanometer or estimating a voltage difference or current flow.

In some arrangements, the change estimating circuit 106 may include a power source 124. In other arrangements, the change estimating circuit 106 may include just the legs 112, 118. Thus, the change estimating circuit 106 may be "complete" or partial. In still other arrangements, only the thermal aging element 104 and appropriate leads for connecting the remainder of the circuit may be positioned on the downhole tool structure. Other variants will be known to those skilled in the art.

Figure 3:
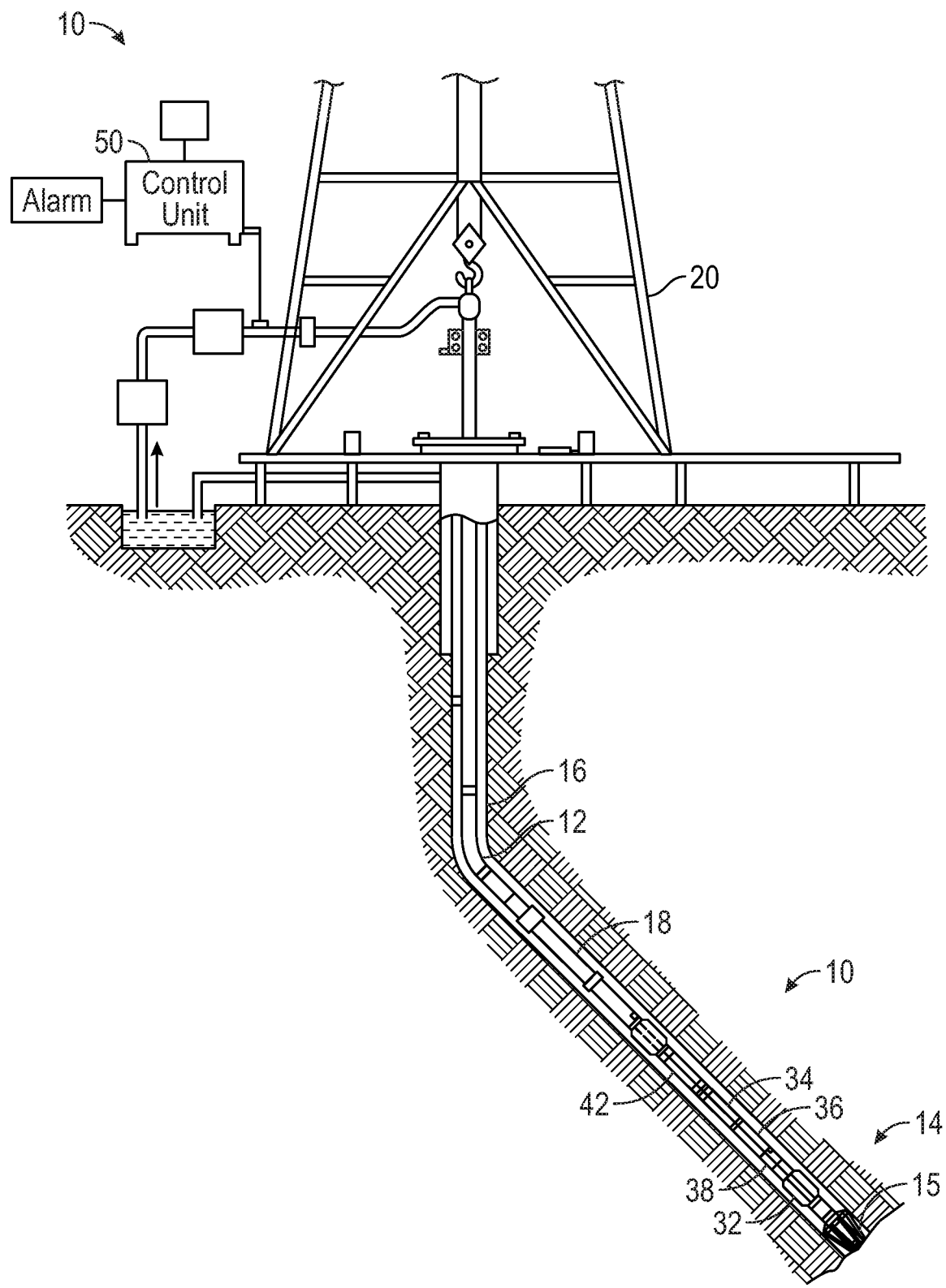
FIG. 3 shows a schematic of a well system that may use one or more thermal aging estimators according to the present disclosure.

Referring now to FIG. 3, there is shown a drilling system 10 that may incorporate thermal aging estimators according to the present disclosure. The drilling system 10 utilizes a borehole string 12 that may include a bottomhole assembly (BHA) 14 for drilling a borehole 16. While a land-based rig is shown, these concepts and the methods are equally applicable to offshore drilling systems. The borehole string 12 may be suspended from a rig 20 and may include jointed tubulars or coiled tubing. In one configuration, the BHA 14 may include a drill bit 15, a sensor sub 32, a bidirectional communication and power module (BCPM) 34, a formation evaluation (FE) sub 36, and rotary power devices such as drilling motors 38. The sensor sub 32 may include sensors for measuring near-bit direction (e.g., BHA azimuth and inclination, BHA coordinates, etc.) and sensors and tools for making rotary directional surveys. The system may also include information processing devices such as a surface controller 50 and/or a downhole controller 42. Components that are susceptible to thermal aging, i.e., heat sensitive components, can be present throughout the drilling system 10.

Referring to FIGS. 1-3, in one mode of use, devices within the drilling system 10 that include a thermal aging estimator are tested periodically, e.g., after every tool run. Personnel at the surface can estimate the permanent change in resistance and use a reference to determine the accumulated thermal aging of heat-sensitive components. A change in resistance can be easily determined using a variety of methods: e.g., (measured resistance—original resistance)/(original resistance). By way of illustration, FIG. 4, shows an illustrative reference in a graph format. Remaining service life hours 90 is along the "X" axis and the estimated change in resistance 92 is along the "Y" axis. The trend 94 represents the remaining service life for an estimated change in resistance. Although 94 is shown as a straight line for convenience to represent a downward trend, its actual shape may require experimental determination and calibration. The line 96 represents a user defined point at which insufficient remaining service life is available to perform a desired well operation. Personnel can ascertain the estimated remaining service life by identifying the corresponding remaining service life to the estimated change in resistance. Components having insufficient remaining service life can be discarded whereas as components having adequate service life can be reused.

It should be noted that estimating the thermal aging of the heat-sensitive component after retrieving the thermal aging element and the heat-sensitive component from the borehole is only one illustrative mode of operation. In other embodiments, the thermal aging of the heat-sensitive component may be estimated while the thermal aging element is still in the borehole. In such embodiments, programmed processors may execute programs, code, algorithms, etc. that perform diagnostics or other testing while the equipment is in the borehole. Such testing or monitoring of accumulated damage due to thermal aging may be done in situ and in "real time" or "near real time."

It should be appreciated that the teachings of the present disclosure provide a simple, passive, and efficient method of estimating the remaining service life. The estimation is not dependent on human or machine recorded data. Thus, errors in entry and corrupt data are eliminated. Further, in some embodiments, the thermal aging estimator is operationally isolated from the heat sensitive component. Stated differently, the heat sensitive component can function as intended if the thermal aging estimator is removed. Indeed, the thermal aging estimator, other than using a minimal amount of space, does require any system resources such as electricity.

While the foregoing disclosure is directed to the one mode embodiments of the disclosure, various modifications will be apparent to those skilled in the art. It is intended that all variations be embraced by the foregoing disclosure. Also, any conveyance device, other than a drill string, may be used to convey motion sensitive devices protected according to the present disclosure along a borehole. Exemplary non-limiting conveyance devices include casing pipes, wirelines, wire line sondes, slickline sondes, drop shots, downhole subs, BHA's, drill string inserts, modules, internal housings and substrate portions thereof, self-propelled tractors.

I claim:

1. A thermal aging estimator for use in a borehole having an ambient temperature of at least 200° F., comprising:
    a heat-sensitive component;
    a thermal aging element positioned adjacent to the heat-sensitive component while in the ambient temperature of at least 200° F., the thermal aging element being configured to have permanent change in an electrical property in response to a thermal exposure, the permanent change correlating to cumulative thermal damage from the thermal exposure, wherein the thermal aging element is a thin-film resistor; and
    a change estimating circuit connected to the thermal aging element and configured to apply an electrical signal to the thermal aging element.

2. The thermal aging estimator of claim 1, wherein the thermal exposure is comprised of a plurality of sub-exposures, wherein each sub-exposure is defined by a time duration and a temperature magnitude, and wherein the permanent change correlates to an accumulation of thermal damage from all of the sub-exposures.

3. The thermal aging estimator of claim 1, wherein the heat-sensitive component is an electrically energized component.

4. The thermal aging estimator of claim 1, wherein the change estimating circuit is formed of members that do not have a permanent change in resistance in response to the thermal exposure.

5. The thermal aging estimator of claim 1, wherein the correlation is defined by the Arrhenius equation.

6. The thermal aging estimator of claim 1, wherein the change estimating circuit is further configured to estimate the permanent change in the electrical property.

7. The thermal aging estimator of claim 1, wherein the thermal aging element is at least partially formed of a material that degrades in response to the thermal exposure.

8. The thermal aging estimator of claim 1, wherein the change estimating circuit is a Wheatstone bridge.

9. The thermal aging estimator of claim 1, wherein the heat-sensitive component, the thermal aging element, and the change estimating circuit are positioned on a common platform.

10. A method of operating a heat-sensitive component, comprising:
    positioning a thermal aging element adjacent to the heat-sensitive component;
    conveying the thermal aging element and the heat-sensitive component into a borehole having an ambient temperature of at least 200° F.;
    energizing the operating downhole tool to perform a predetermined function; and
    estimating the thermal aging of the heat-sensitive component by estimating a permanent change of an electrical property of the thermal aging element due to a thermal exposure, wherein the permanent change correlates to cumulative thermal damage from the thermal exposure, and wherein the thermal aging element is a thin-film resistor.

11. The method of claim 10, wherein the thermal exposure is comprised of a plurality of sub-exposures, wherein each sub-exposure is defined by a time duration and a temperature magnitude, and wherein the permanent change correlates to an accumulation of thermal damage from all of the sub-exposures.

12. The method of claim 10, wherein the circuit is formed of members that do not have a permanent change in resistance in response to the thermal exposure.

13. The method of claim 10, wherein the correlation is defined by the Arrhenius equation.

14. The method of claim 10 , wherein the thermal aging of the heat-sensitive component is estimated while the thermal aging element is still in the borehole.

15. The method of claim 10, further comprising estimating the thermal aging of the heat-sensitive component after retrieving the thermal aging element and the heat-sensitive component from the borehole.

16. The method of claim 15, further comprising deploying the downhole tool again if the determined estimated change is below a predetermined value.

17. A method for estimating a thermal aging of a heat-sensitive component, comprising:
    positioning a thermal aging element adjacent to the heat-sensitive component;
    conveying the thermal aging element and the heat-sensitive component into a borehole having an ambient temperature of at least 200° F.; and
    estimating the thermal aging of the heat-sensitive component by estimating a permanent change of an electrical property of the thermal aging element, wherein the permanent change correlates to cumulative thermal damage from the thermal exposure and wherein the thermal aging element is a thin-film resistor.

\* \* \* \* \*